(12) United States Patent
Thumann

(10) Patent No.: US 8,453,974 B1
(45) Date of Patent: Jun. 4, 2013

(54) FLOW CHANNELS

(75) Inventor: Gregory G. Thumann, Rose Hill, KS (US)

(73) Assignee: The Boeing Company, Chicago, IL (US)

( * ) Notice: Subject to any disclaimer, the term of this patent is extended or adjusted under 35 U.S.C. 154(b) by 359 days.

(21) Appl. No.: 12/966,264

(22) Filed: Dec. 13, 2010

(51) Int. Cl.
 *B64C 1/38* (2006.01)
(52) U.S. Cl.
 USPC .......................... 244/130; 244/199.1; 244/15
(58) Field of Classification Search
 USPC .................... 244/130, 199.1, 213, 135 A
 See application file for complete search history.

(56) References Cited

U.S. PATENT DOCUMENTS

| | | | | |
|---|---|---|---|---|
| 3,960,345 | A * | 6/1976 | Lippert, Jr. .................... | 244/130 |
| 4,225,102 | A * | 9/1980 | Frosch et al. .................. | 244/130 |
| 4,489,905 | A * | 12/1984 | Bengelink et al. ............ | 244/130 |
| 6,060,411 | A * | 5/2000 | Cline et al. .................... | 442/132 |
| 6,578,798 | B1 * | 6/2003 | Dizdarevic et al. ......... | 244/199.1 |
| 6,588,703 | B1 * | 7/2003 | Hartmann .................... | 244/35 R |
| 6,854,687 | B1 * | 2/2005 | Morgenstern et al. ......... | 244/15 |
| 7,331,752 | B2 * | 2/2008 | Kiknadze et al. ................ | 415/1 |
| 8,245,981 | B2 * | 8/2012 | Rainous et al. ............ | 244/200.1 |
| 2006/0284023 | A1 * | 12/2006 | Lejeau et al. ................. | 244/213 |
| 2009/0289149 | A1 * | 11/2009 | Schwetzler ................ | 244/199.1 |
| 2010/0038492 | A1 * | 2/2010 | Sclafani et al. ............ | 244/199.1 |
| 2010/0065680 | A1 * | 3/2010 | Huber et al. .................... | 244/1 N |
| 2010/0282908 | A1 * | 11/2010 | Laborie ......................... | 244/130 |
| 2012/0091270 | A1 * | 4/2012 | Moore et al. ................... | 244/1 N |
| 2012/0175910 | A1 * | 7/2012 | Birkenstock ............... | 296/181.5 |

OTHER PUBLICATIONS

Hooker, J.R., "Aerodynamic Development of a Refueling Pod for Tanker Aircraft", 20th AIAA Applied Aerodynamic Conference, Jun. 24-26, 2002, St. Louis, Missouri.

* cited by examiner

*Primary Examiner* — Christopher P Ellis
*Assistant Examiner* — Medhat Badawi
(74) *Attorney, Agent, or Firm* — Christopher J. Knors; Moore & Van Allen PLLC

(57) ABSTRACT

The present disclosure relates to flow channels comprising a channel length having a first portion approximately parallel to the maximum waterline thickness location of a body and at least a second portion non-parallel thereto, a leading edge at a first end of the channel length, the leading edge separated from a trailing edge by a free edge along the channel length, the free edge projecting a predetermined height from an attaching edge attachable to at least a portion of the surface of the body, and at least a portion of the free edge being arcuate. A method comprises providing the fluid channel attachable to a body, modifying resultant vortices and reducing or minimizing shock formations or separation regions of the freestream.

25 Claims, 8 Drawing Sheets

FLOW CHANNELS

TECHNICAL FIELD

This disclosure relates generally to flow channels for bodies on a aerospace vehicle and the reduction or elimination of vibration and/or buffet caused by the bodies during flight.

BACKGROUND

It is frequently necessary to suspend bodies from 3 dimensional airfoil structures, e.g., wings of aerospace vehicles, for any of a number of reasons. For example, it may be necessary to suspend bodies having arbitrary structural properties from aerospace vehicles during flight. Such bodies can include, for example, weapons, radar, sensors, and probes suspended from wings. Other bodies may require being dragged behind the aerospace vehicle and include, for example, instruments for obtaining meteorological data measurements of the atmosphere, or refueling pods with hose and drogues. In most cases, the aerospace vehicle moves through the air at very high velocities resulting in turbulent vortices around the suspended body and/or downstream of a dragged body. As a result, aerodynamic forces on the body generated by vortices can result in undesired vibration and/or buffet.

The properties of these vortices depend on the shape of the bodies and the air speed of the vehicle. In the case of a refueling pod, for example, an opening in the pod for exiting of a hose and of its stabilizing cage has to be provided. Such an opening may present a larger dimension, due to which a blunt construction shape is generated in the rear region of the refueling pod. This aft blunt stream body shape presents aerodynamic disadvantages, as vortices and turbulences form downstream and possibly in proximity to the wing/pylon resulting in undesirable vibration of the wing. Moreover, even a so-called streamlined body, such as a weapon or other pod-like store can create disruptions of the air stream in proximal to the body at high speeds such as transonic speeds sufficient to cause vibration and/or buffet.

Historically, aircraft manufacturers have believed that the best way to mount engines, stores, and other such items on high speed (e.g., transonic) wings is to move the item as far forward of the wing as is structurally possible to minimize the aerodynamic interactions between the wing and the item(s) being attached. In the case of Wing Aerial Refueling Pods (WARPs), however, integration restraints as to where the WARPs can be placed relative to the wing may not allow for such optimal placement. In certain WARPs configurations, e.g., mounted directly under the wing, where a superposition of the maximum thickness of the pod/pylon and the wing closely coincided, adverse behavior including excess vibration and/or buffet can result.

Thus, when a body, even a streamlined body, is combined with a generic transonic wing, deleterious aerodynamic impacts can be realized in the form of vibration or buffet problems. At such high speed, the body can drive regions of complex shock formations and/or pockets of separation which act as primary sources for vibration and/or buffet experienced by the aerospace vehicle.

SUMMARY

It is a solution to the problem of driving regions of complex shock formations and/or pockets of separation which act as primary drivers for vibration and/or buffet experienced by the aerospace vehicle away from the body, pylon, and/or wing so as to reduce or eliminate undesirable vibration and buffet of the aerospace vehicle underlying the present disclosure.

Thus, in a first embodiment, a flow channel attachable to a body positioned on an wing of an aerospace vehicle is provided. The flow channel comprises a channel length having a first portion essentially parallel to the maximum waterline thickness location of the body and at least a second portion non-parallel to the maximum waterline thickness location of the body, a leading edge at a first end of the channel length, the leading edge separated from a trailing edge by a free edge along the channel length, the free edge projecting a predetermined height from a attaching edge attachable to at least a portion of the surface of the body, and at least a portion of the free edge is arcuate.

In a second embodiment, a method of reducing vibration and/or buffet of an aerospace vehicle having a body on a wing is provided. The method comprises providing at least one flow channel attachable to the body, the flow channel comprising a channel length having a first portion parallel to the maximum waterline thickness location of the body and at least a second portion non-parallel to the maximum waterline thickness location of the body, a leading edge at a first end of the channel length, the leading edge separated from a trailing edge by a continuous free edge along the channel length, the free edge projecting a predetermined height from a bottom edge attachable to at least a portion of the surface of the body, and at least a portion of the free edge is arcuate. The method further comprises creating and/or modifying resultant vortices formed at air speeds between about 0.2 to about 0.9 mach, and reducing or minimizing shock formations or separation regions of the freestream.

BRIEF DESCRIPTION OF THE FIGURES

Embodiments of the present disclosure are described below with reference to the enclosed drawings, in which.

DETAILED DESCRIPTION

Figure 1:
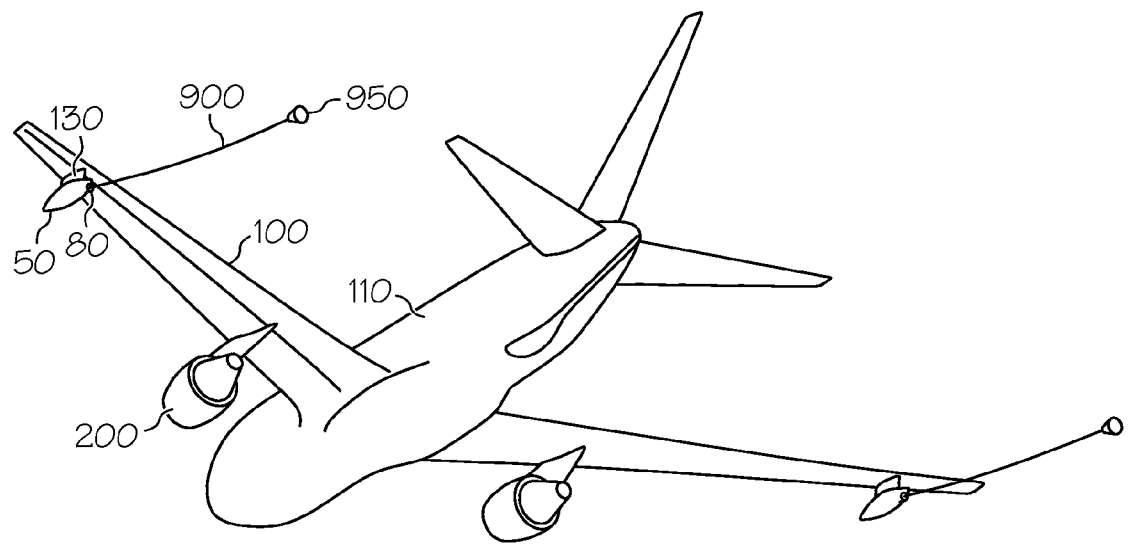
FIG. 1 shows a perspective representation of an aerospace vehicle that is provided with a flow channel arrangement on the respective store, in this instance, a refueling pod.

By placing flow channels of predetermined configuration, strategically on a body position on a wing, as herein disclosed and described, the specific flow behaviors of the particular body causing shock formations and separation regions can be reduced or eliminated. The present disclosure therefore relates to flow channels configured to be mounted on an exterior airflow surface of body carried by an aerospace vehicle and methods to reduce or eliminate vibration of an aerospace vehicle caused by such bodies. The disclosed and described flow channels are unique in that they function differently than vortex generators, in that the instant flow channels provide for control of flow vortical strength and tailoring of the flow fields associated with the body, e.g., by moving large amounts of flow mass to areas needed on the wing/pylon configuration In one aspect, the present disclosure relates to a body with an arrangement of at least one flow channels designed so that it affects the specific flow behaviors of the body resulting in the reduction or elimination of shock formations and separation regions otherwise caused by the store.

According to another aspect of the present disclosure, the flow over the body is subject to shock formations and separation regions remote from the airfoil from which the body is suspended or attached. Accordingly, this alters the boundary layer in an area about the body and provides for a reduction or elimination of vibration and/or buffet of the airfoil during flight.

In this disclosure, the term "body" refers generally to structure adjacent to or attached to an airfoil surface of an aerospace vehicle, e.g., a wing. The term body encompasses the term "store" or "stores." The body can include a variety of structures typically deployed on or dragged behind such vehicles, such as refueling pods, hose/drogues, weapons, and/or instrumentation. The body is not limited to such structures and can include, for example, engine housings. Other structures may benefit from the flow channels described herein. Throughout the present disclosure, the term "store" may be used in an exemplary, non-limiting manner as representative of a body. Typically a store comprises a first and a second side associated with its housing, the two sides lying opposite of one another with respect to the store pylon, i.e., the respective side that faces the aerospace vehicle fuselage (inboard side) and the corresponding opposed side that is directed away from the aerospace vehicle fuselage (outboard side).

A typical flow channel installation includes a single flow channel installed on one or both the inboard and outboard sides of the store; though variations in store configuration could merit multiple flow channels on the side of a store in certain situations. Flow channel length, orientation, and geometric height relative to the store's surface are dictated by the aerodynamics of a given store shape.

In general, guidelines can be implemented for initial flow channel placement on a given store. For example, the most forward point of the flow channel, its leading edge, can be located on approximately the first one third of the store's horizontal axial length. The channel's leading edge, specifically the edge not attached to the store, is rounded in plan form to reduce or eliminate early vortex shedding. The leading edge can be located in a generally vertical orientation approximately at the store's maximum waterline thickness location and oriented to be either parallel with the store's centerline axis, as viewed from either side of the store, or oriented downwardly between about zero to about five degrees relative to the store's centerline axis as dictated by aerodynamics analysis of the particular store. Following along the flow channel's length from fore to aft, the channel's curvature varies from linear or nearly linear for the first two thirds of the channel's length with the curvature increasing and then to a higher rate of curvature in the channel's last third of length. This arcuate structure has the effect of causing the fluid channel to wrap up towards the top of the store. The flow channel's trailing edge comprises an angular termination plan form distinct from the leading edge that provides an efficient shedding of vortical air structures. The angular termination of the trailing edge can be sharp.

The placement of the channel's trailing edge on the store is a function of the particular unwanted aerodynamics effects that the body presents to the wing as a result of the store's configuration. Typically, multiple analysis iterations are performed related to the store without channels and then with channels to determine flow channel impacts and to provide refinement of the flow channel's placement, orientation, length, arcuateness, and height parameters. Once flow channel length, trailing edge location, and orientation are settled, the flow channel's height can be further adjusted to directly affect the shedding vortex strength (e.g., physical rotational size and rotational velocity of the vortex created) that the channels produce. In one aspect, flow channels can be provided with some height just beyond the rounded leading edge and can be constructed such that there is an increase in height gradually moving from fore to aft in a more or less linear fashion. In other aspects, a more aggressive channel height variation is desirable. This can be useful in cases were channel height, typically the most effective variable for controlling vortex strength, needs to be limited for installation reasons.

Thickness of the flow channel can be adjusted and/or optimized to correspond with structural and integration requirements, but preferably, the flow channels thickness should be a minimal as possible. Likewise, the flow channel's free edge, e.g., the edge not attached to the store, can be tapered, and in some aspects, can be provided as sharp as can reasonably possible without impacting construction or safety. In certain aspects, a sharp free edge on the flow channel maximizes the flow channel efficiency. In one aspect, the free edge is a continuous edge between the leading and trailing edges of the flow channel.

The flow channels as disclosed and described herein are configured to direct flow momentum, by means of very strong vortex structures, into the regions of flow where large energy losses dominate due to configuration aerodynamic compromises. In effect, the channels are air flow momentum enhancement and transport devices, moving and accelerating air flow from regions of stable/well-behaved aerodynamics to regions with less desirable flow. As such, the disclosed and described flow channels are unique in that they function differently than vortex generators, in that the instant flow channels provide for control of flow vortical strength and tailoring of the flow fields associated with the specific body.

In one aspect of the present disclosure, a store for an aerospace vehicle is provided with at least one flow channel arranged on one or both sides of the store housing in such a way that vortices generated by the flow channels are repositioned in order to reduce or eliminate shock formations and/or separation regions of the air flow.

The air flowing around the store housing is subjected to relatively small vortex formation, shock formation, and separation, which is reduced or eliminated by the at least one flow channel attachable to the store, the flow channel comprising a channel length, a leading edge at a first end of the channel length, the leading edge separated from a trailing edge by a free edge along the channel length, the free edge projecting a predetermined height from an attaching edge attachable to at least a portion of the outer surface of the store, at least a portion of the free edge being arcuate.

In one aspect, a single flow channel may be arranged, in particular, on the inboard side of the store housing. According to another aspect of the present disclosure, the flow channel is arranged on the outboard side of the store housing. According to yet another aspect of the present disclosure, at least one or more flow channels are arranged, independently, on both the inboard side and outboard side of the store housing. In another aspect of the present disclosure, two or more flow channels can be arranged on one or both sides of the store housing.

The leading edge and a portion of the free edge of the flow channel can be positioned essentially parallel to the maximum waterline thickness location of the store. In one aspect, the leading edge of the flow channel is positioned above this body location relative the pylon. The leading edge and a portion of the free edge of the flow channel can be positioned on the outer surface of the store about 5 degrees to about 175 degrees relative to a circumferential store angle phi, the circumferential phi angle defined as the angle between the line through wing thickness direction or vertical axis (or plane) and an imaginary line (or plane) normal to the store longitudinal axis that connects all the centroids of the store. The optimization of the circumferential store angle phi for the one or more flow channels on either side of the store can be determined interactively in a wind tunnel, particularly by measuring the vortex positions about the store in relation to the wing and/or pylon. Flow calculations can be used for optimizing purposes prior to the wind tunnel tests by determining a global flow field and potential vortex positions that likely will negate shock or separation regions.

The leading edge and a portion of the free edge can deviate from parallel relative to the maximum waterline thickness location of the store by an angle delta of about +/−15 degrees, preferably +/−10 degrees, and most preferably less than +/−5 degrees. Preferably, any deviation of the leading edge is generally downwardly of the maximum waterline thickness location of the store.

In one aspect, the free edge of the flow channel that protrudes from the attachment edge connected to at least a portion of the exterior airflow surface can extend in a continuously ascending fashion from the exterior airflow surface of the store housing to a maximum height located approximately at the trailing edge of the flow channel above the attachment edge. Other configuration of the free edge along the length of the flow channel are envisaged, for example, a uniform height from the attachment edge along the length of the flow channel between the leading and trailing edge, or a sinusoidal or jagged edge height.

On one or more of the opposing outer surfaces of the flow channel topographical structural features can be employed to control or modify the free stream and/or vortices. Such structures include, for example, bumps, mach strips, straight-edged vortices generators, depressions, grooves, and coatings of any geometrical design or pattern as desired or found to effect the control of vortices. In one aspect, the topographical surface of the flow channel is essentially smooth and/or polished to a practical minimum of surface roughness.

In one aspect, the free edge of the flow channel deviates from parallel to the maximum waterline thickness of the store for about the first two thirds of the channel length. For example, at least a portion of the free edge of the flow channel along its longitudinal length essentially conforms to an arcuate surface of the store, e.g. the circumferential outer surface of a pod-shaped store.

In one aspect, the leading edge of the flow channel is rounded in planform. In one aspect, the flow channel is configured parallel to the maximum waterline thickness location of the body and about zero to about five degrees downwardly relative to perpendicular of the air flow surface of the store. In a preferred aspect, the leading edge profile is perpendicular to the airflow surface of the store so as to minimize or reduce early vortex shedding.

In one aspect, the trailing edge of the flow channel has an abrupt, sharp, angular termination planform configured so as to shed vortical air structures. In one aspect, the terminus of the trailing edge is positioned at a circumferential phi angle different from the point of origin of the leading edge. In one aspect, the terminus of the trailing edge is positioned at a smaller circumferential phi angle than the leading edge, e.g., in closer proximity to the pylon securing the store, by virtue of the arcuate free edge.

The flow channel has a predetermined height that is a function of the particular store. In one aspect, the height is essentially uniform along the free edge of the flow channel. In another aspect, the flow channel height essentially linearly increases from the leading edge to the trailing edge. The predetermined height (H) of the flow channel can be defined as vector, the vector originating at the attachment edge, the angle of the vector relative to a store surface tangent at the attachment edge can vary between about 45 degrees to about 135 degrees providing a "pitch angle." For example, the flow channel can pitch about the store surface tangent along its length such that the free edge and the attachment edge are not congruent relative to the normal vector from the body surface at the attachment edge. The pitch angle can be variable along one or more portions of the length of the flow channel, or the angle of the vector can be fixed along the length of the flow channel. The vector angle is preferably predetermined along one or more portions of the length of the flow channel to maximize vortex shedding of a free stream traveling at a velocity of between about 0.2 to 0.9 mach. At least a portion of either surface or both opposing surfaces of the flow channel can be arcuate.

In one aspect, at least a portion of one or more of the leading edge, free edge, and trailing edge of the flow channel is tapered.

The flow channel can be configured such that the entire attaching edge of the flow channel is attachable to the surface of the body. Suitable attachment means include nut plates, and tongue/groove configurations, for example. Welding of one or more portions of the attachment edge to the outer surface of the store can be employed.

In its attachment edge or intersecting region with the exterior airflow surface of the store housing, the flow channel can have a first portion length that extends initially parallel to the maximum waterline thickness position of the store. The flow channel can also comprise a second portion length that deviates from parallel to the longitudinal direction of the store in an arcuate manner. The first and second portions can be integral or can be configured for assembly at point of use. The extent and degree of arcuate deviation from parallel of the longitudinal direction of the store can be adjusted to optimize the flow channel effectiveness in reducing shock formation and separation regions interactively in a wind tunnel, particularly by measuring the vortex positions about the store in relation to the wing and/or pylon. Flow calculations can be used for optimizing the arcuate free edge portion (and/or corresponding attaching edge portion) of the flow channel arcuate region prior to the wind tunnel tests.

In another embodiment of the present disclosure, a method of reducing vibration and/or buffet of an aerospace vehicle having a body on wing is provided. The method comprises providing at least one flow channel attachable to the body. The flow channel is as described above, comprising a channel length having a first portion parallel to the maximum waterline thickness of the body and at least a second portion non-parallel thereto. A leading edge is presented at a first end of the channel length, the leading edge separated from a trailing edge by a free edge along the channel length, the free edge projecting a predetermined height from an attachment edge attachable to at least a portion of the surface of the body. At least a portion of the free edge is arcuate between the leading edge and trailing edge. The method provides for modifying resultant vortices formed at air speeds between about 0.2 to about 0.9 mach and for reducing or minimizing shock formations or separation regions of the freestream.

In certain aspects, the method further comprises driving regions of complex shock formations and/or pockets of separation aft of the wing and/or body. The method can further comprise placing a plurality of flow channels about the body so as to affect specific flow behaviors of the vortices. The plurality of flow channels can include flow channels attached on one or both of the inboard and outboard sides of the body.

In other aspects of the method, the leading edge of the flow channel can be configured so as to provide shedding of the desired vortical air structures caused by the body during flight. For example, the predetermined height of the flow channel can be configured to provide a target shedding vortex strength (e.g., the physical rotational size and rotational velocity of the vortex created). The configuration of the particular flow channel relative to the particular body for optimizing shedding of the vortical air structures and the target shedding vortex strength can be determined interactively in a wind tunnel, particularly by measuring the vortex positions about the body in relation to the wing and/or pylon.

FIG. 1 shows an oblique bottom view or perspective representation of an aerospace vehicle 110, having underwing stores of which are provided with flow channels according to the description herein. The aerospace vehicle features a wing 100 having stores 50 positioned outboard of engine 200, exemplified as refueling pods containing hose 900 and drogue 950 extendable from opening 80. The stores 50 are structurally connected to the wing 100 by means of respective store pylons 130.

Figure 2:
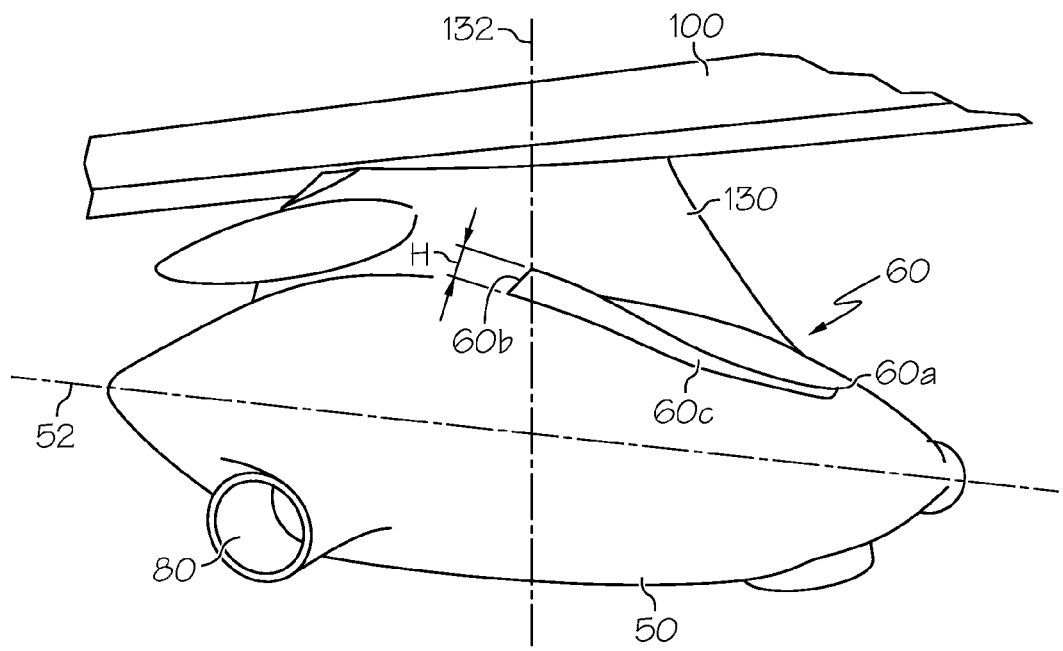
FIG. 2 shows a perspective representation of part of a wing with a store that is provided with a flow channel arrangement on the inboard side of the store.

According to the partial perspective side view shown in FIG. 2, in which the viewing direction is looking outboard from the fuselage aft section, flow channel 60 is provided for generating a vorticity field that extends aft of the store and proximal to the pylon 130 and wing 100 as discussed further below. Store 50 presents a longitudinal axis 52 (that connects all the centroids of the store but not including the mounting pylon) corresponding essentially to the maximum waterline thickness location. Through wing thickness direction or vertical axis 132 bisects axis 52 and pylon longitudinal axis. Flow channel 60 comprises a channel length having a first portion 60a essentially parallel to the maximum waterline thickness location of the store and at least a second portion 60c non-parallel to the maximum waterline thickness location of the store. Leading edge 60a is positioned at a first end of the channel length, the leading edge separated from trailing edge 60b by a free edge 60c along the channel length, the free edge projecting a predetermined height (H) from a bottom attaching edge attachable to at least a portion of the surface of the store. As shown, at least a portion of the free edge 60c is arcuate between leading edge 60a and trailing edge 60b or encompassing trailing edge 60b.

Figure 3A:
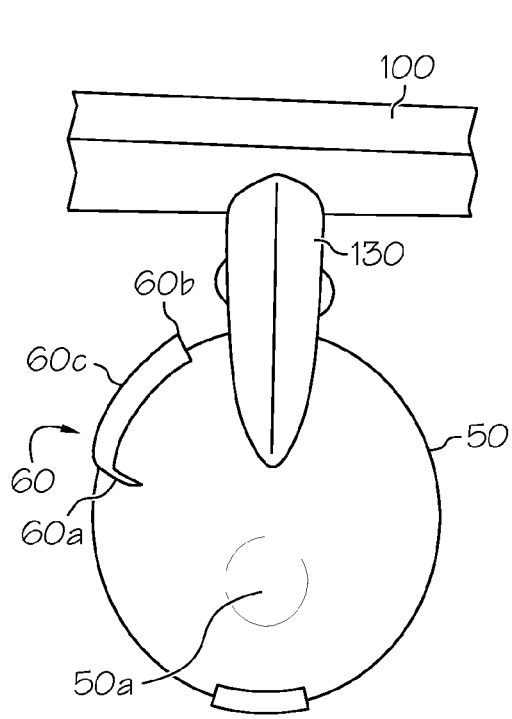
FIGS. 3A and 3B shows a perspective representation of a wing section of an aerospace vehicle with store and pylon arranged thereon, namely viewed in the fore and aft direction, respectively, wherein a single flow channel arrangement according to one embodiment of the present disclosure are respectively provided on the store.
Figure 3B:
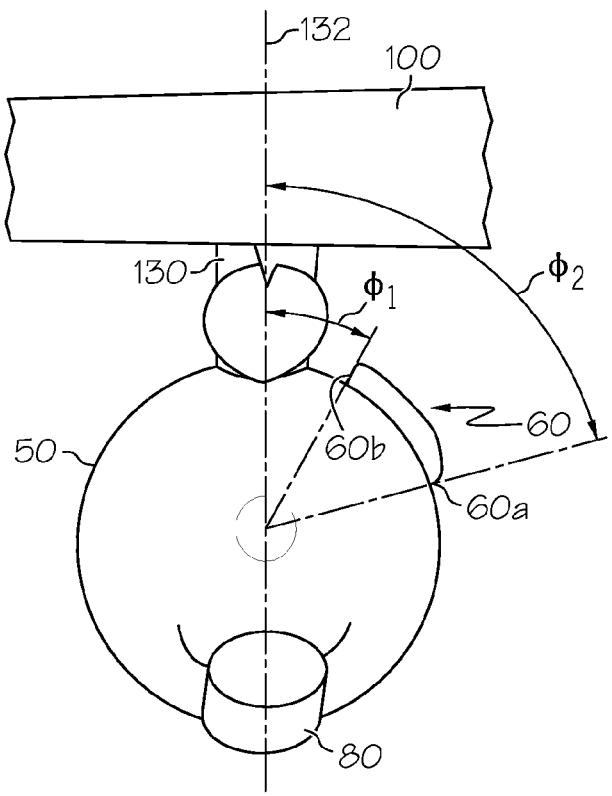

Forward and aft views of store 50 are shown in FIGS. 3A and 3B, respectively. FIG. 3A depicts store leading edge 50a and leading edge 60a of flow channel 60. Flow channel leading edge 60a is positioned at a predetermined circumferential phi angle ($\phi$ 2) and presents a plan profile that is essentially perpendicular relative to the store surface. Free edge 60c of flow channel 60 is shown in an arcuate configuration terminating in trailing edge 60b, which is positioned a predetermined circumferential phi angle ($\phi$ 1) less than that of the leading edge of flow channel 60 so as to eliminate or reduce shock formations or flow separations caused by the store leading edge or by the intersection between the pylon and the wing.

Figure 4:
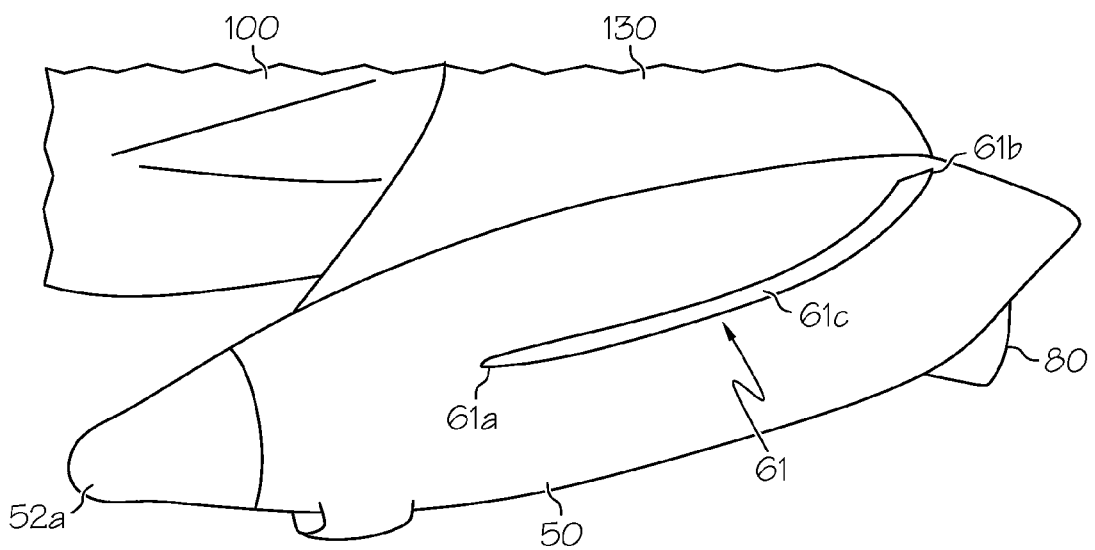
FIG. 4 shows a side perspective representation of a store with an embodiment of a flow channel provided on the outboard side of the store.

FIG. 4 depicts a refueling pod 50 viewed from the outboard side under the wing comprising outboard flow channel 61 secured to pod 50 at attachment edge of the flow channel. Free edge 60c is shown in arcuate configuration between leading edge 60a and trailing edge 60b. In this configuration, flow channel 60 influences shock formations or flow separations caused by store leading edge 50a or by the intersection between the pylon and the wing, shifting the shock formations and/or flow separations aft of store between airfoil 100 and pylon 130.

Figure 5A:
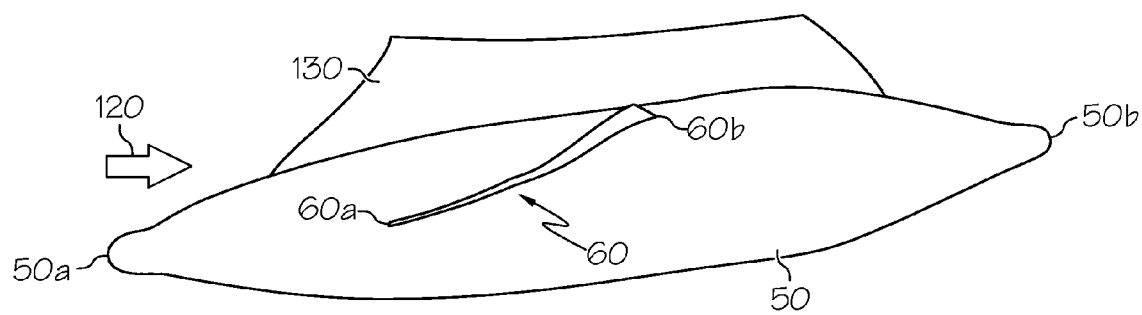
FIGS. 5A and 5B show an inboard side view and top view (wing absent), respectively, of a store with an arrangement of two flow channels (inboard and outboard) as disclosed and described herein.
Figure 5B:
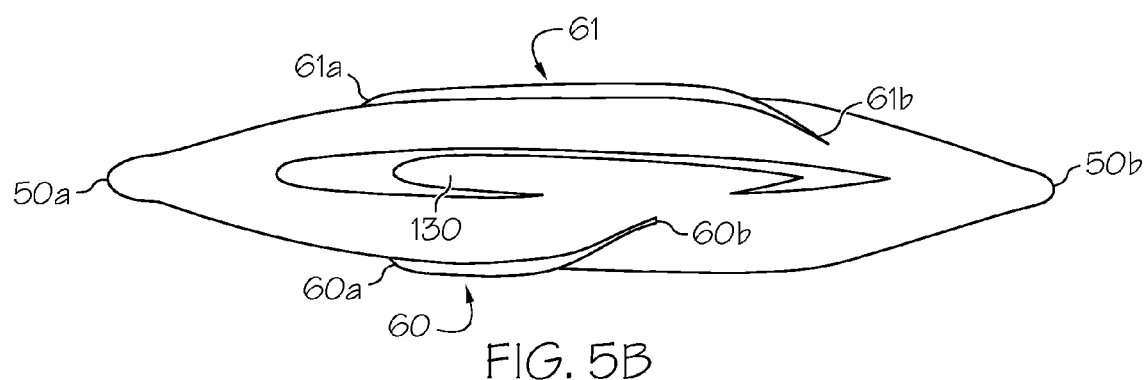

FIGS. 5A and 5B depict inboard side view and top view (wing hidden), respectively of store 50 having a plurality of flow channels 60, 61 positioned on opposite sides of the store. As shown, leading edges 60a, 61a are positioned essentially along the same longitudinal store axis position relative to leading edge 50a of store and freestream 120. Trailing edges 60b, 61b are shown having a circumferential phi angle less than that of their corresponding leading edges (e.g., closer to the pylon). The choice of phi angle position and overall length of each of the plurality of flow channels can be adjusted to optimize the influence on shock formations or flow separations caused by the store leading edge or by the intersection between the pylon and the wing for the inboard and outboard free streams over the surface of the store, shifting the shock formations or flow separations aft of the store between the airfoil and pylon as needed to reduce or minimize vibration and/or buffet. The shape, size, and position of flow channels 60 and 61 may (or may not) be configured symmetric with respect to the store because the wing to which the store is attached may (or may not) be symmetric with respect to the store center line. The wing is the dominant aerodynamic influence that may require asymmetric flow channel implementation on each side of the store to mitigate/negate the undesirable shock formations or flow separations.

Figure 6:
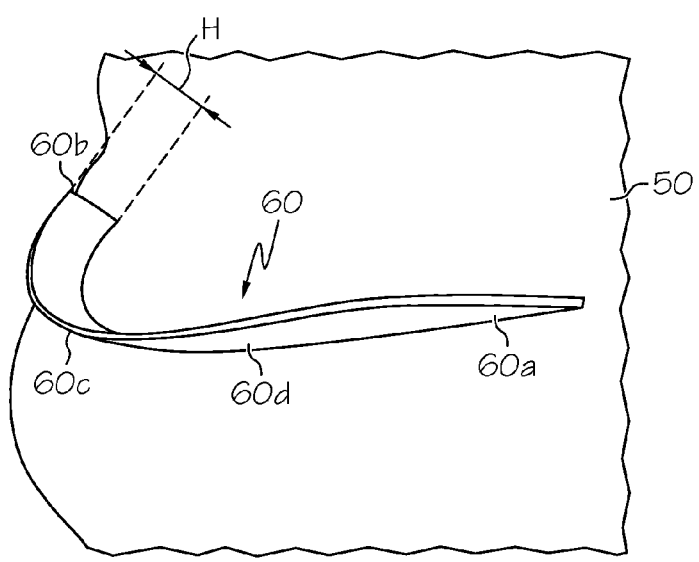
FIG. 6 shows a side perspective representation of a flow channel with arcuate free edge as disclosed and described herein.

FIG. 6 represents a perspective side view of a representative flow channel 60 having free edge 60c arcuately attach to the curved surface of store 50 at attachment edge 60d. Arcuate shaping of free edge 60c and its length between leading and trailing edges (60a, 60b) of the flow channel can be optimized as discussed above, e.g., interactively in a wind tunnel, particularly by measuring the vortex positions about the store in relation to the airfoil and/or pylon for a given degree of arc of free edge 60c and/or length of free edge alone or in combination with the plan shape of the leading edge and abrupt, angular termination of the trailing edge. Flow calculations can be used for optimizing purposes prior to the wind tunnel tests by determining a global flow field and potential vortex positions that likely will negate shock or separation regions. The free edge thickness of the flow channel should be minimized relative to the minimum thickness needed to insure the flow channel retains design contour under operational load and insure structural design safety requirements.

Figure 7:
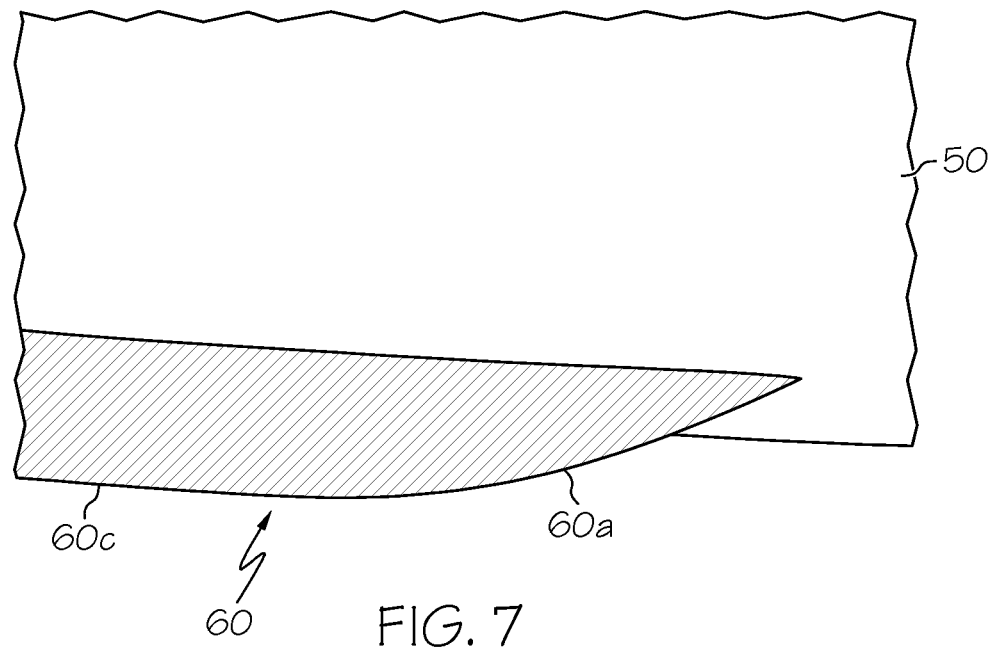
FIG. 7 shows a side perspective representation of a flow channel leading edge as disclosed and described herein.

FIG. 7 depicts a prospective sectional view of flow channel 60 showing leading edge 60a shown rounded in plan form with its profile perpendicular to the store surface so as to minimize or reduce early vortex shedding. The longitudinal length leading edge portion of the flow channel can be of a length anywhere between about 3 inches to about 15 inches, more preferably between about 5 inches to about 10 inches. In one aspect, the longitudinal length leading edge portion of the flow channel can be about 7 inches. The vertical height (H) of the leading edge portion of the flow channel can reach an apex of anywhere between about 0.5 inches to about 5 inches. In one aspect, the vertical height of the leading edge portion of the flow channel can be about 2 inches. Other longitudinal lengths and vertical heights of the leading edge portion can be used dependent on the geometric parameters of the store.

Figure 8:
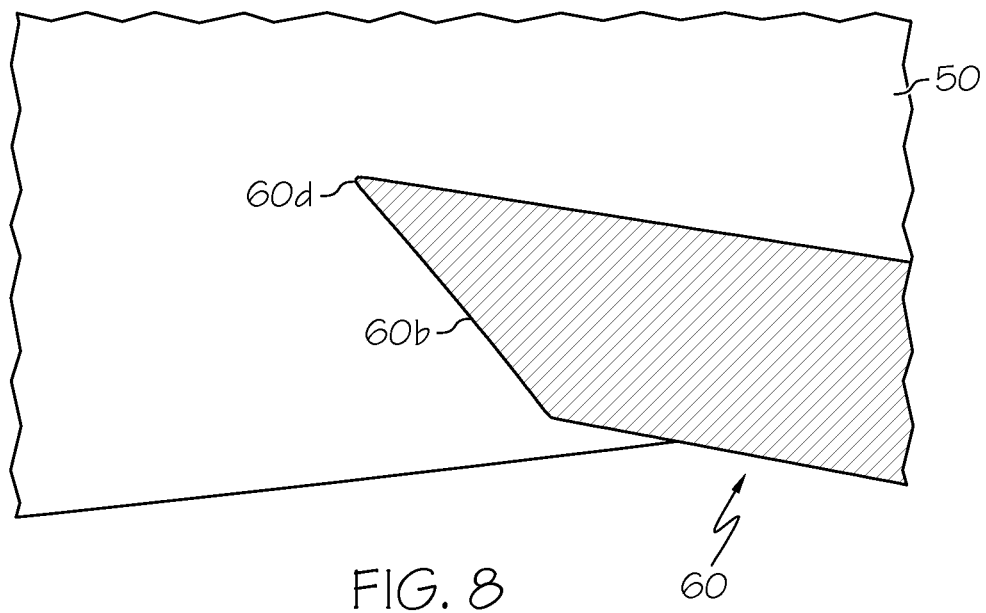
FIG. 8 shows a side perspective representation of a flow channel tailing edge as disclosed and described herein.
Figure 9A:
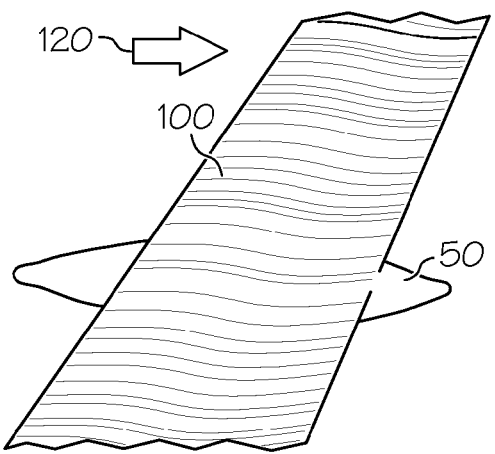
FIGS. 9A and 9B show a computational perspective representation of flow streamlines for a wing, top and bottom views respectively, (store hidden in bottom view) without the flow channel.
Figure 9B:
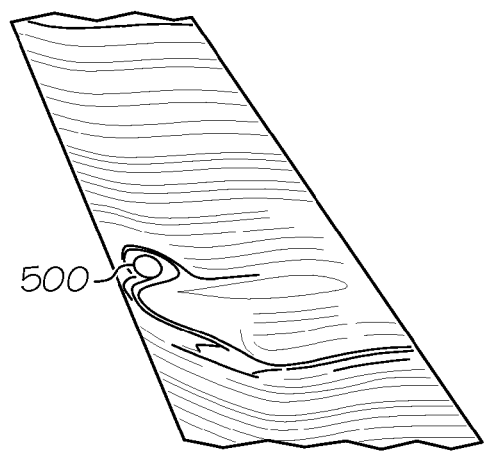
Figure 10A:
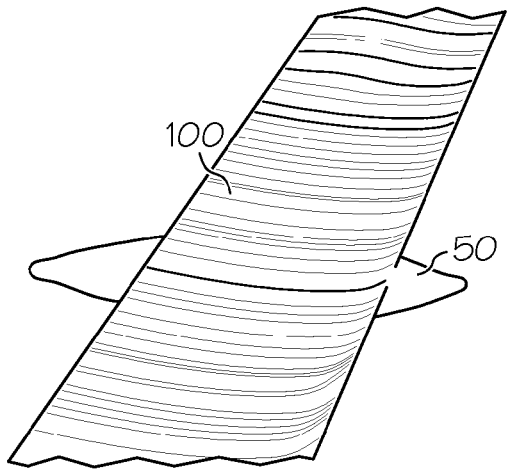
FIGS. 10A and 10B show a computational perspective representation of flow streamlines for a wing, top and bottom views respectively, (store hidden in bottom view) with a single, inboard flow channel.
Figure 10B:
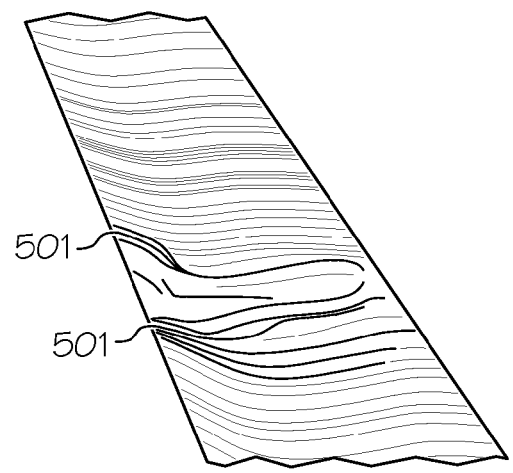
Figure 11A:
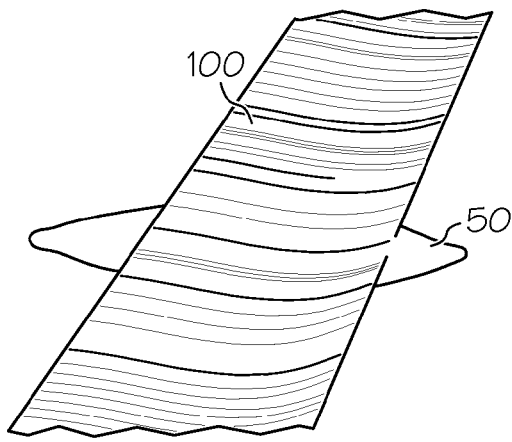
FIGS. 11A and 11B show a computational perspective representation of flow streamlines for a wing, top and bottom views respectively, (store hidden in bottom view) with both an inboard and outboard flow channel.
Figure 11B:
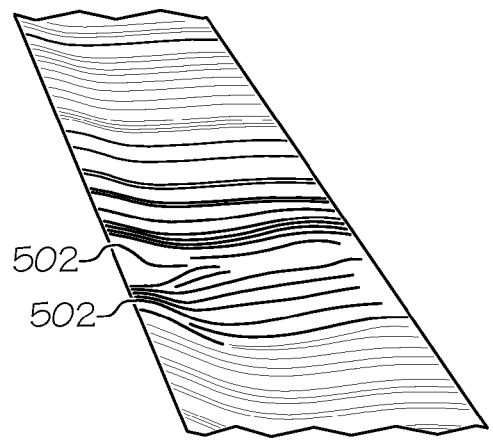

FIG. 8 depicts a perspective sectional view of flow channel 60 showing a portion of trailing edge 60b shown in abrupt, angled termination. Preferably, attachment point 60d of the terminus of trailing edge 60b to the body surface is further along the longitudinal axis of the body measured from forward than the point of maximum height of trailing edge 60b. The vertical height (H) of trailing edge 60b of the flow channel can be equal to or greater than leading edge 60a height. For example, the vertical height of trailing edge 60b portion of flow channel 60 can be about 4.5 inches whereas leading edge 60a height can be about 2 inches. Preferably, free edge 60a increases in vertical height (H) along flow channel 60 from leading edge 60a to trailing edge 60b. The height can vary linearly or non-linearly along the free edge. Other vertical heights of the leading edge portion can be used dependent on the geometric parameters of the store 50.

FIGS. 9A, 9B, 10A, 10B, 11A, and 11B, depict computational fluid dynamic modeling images of a wing with an underwing store (above and below wing, store hidden from view) without flow channels, with an inboard flow channel, and with both an inboard and outboard positioned flow channel, respectively, the flow channels modeled being representative of that as disclosed and described herein. It is evident that the deployment of the flow channels provides improvement of streamline and shock behaviors, represented by dark areas 500 of FIG. 9B as compared with 501 and 502 of FIGS. 10B and 11B, respectively.

Figure 12A:
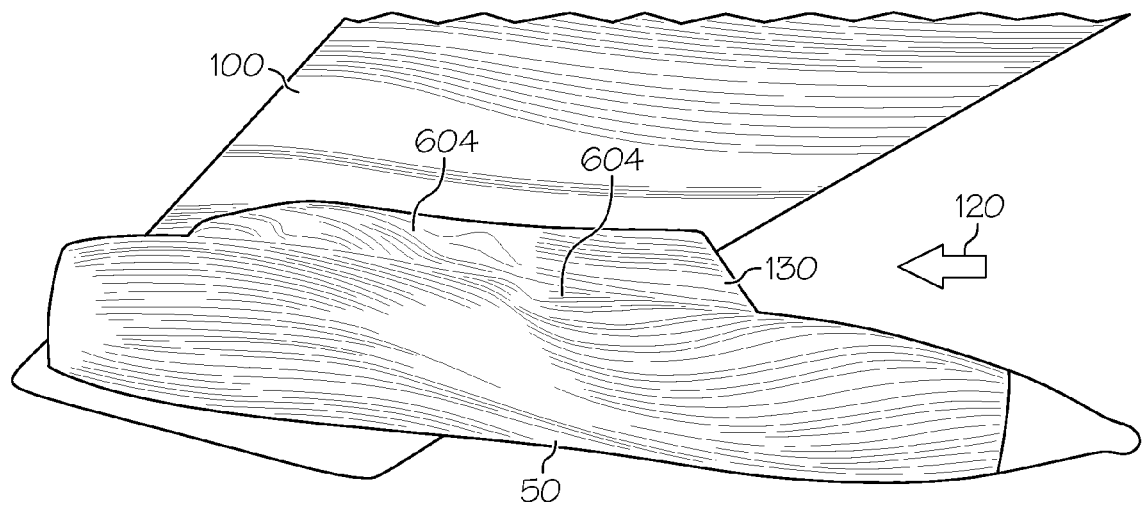
FIGS. 12A and 12B show windtunnel photographs of an inboard side perspective representation of flow streamlines for a wing/pylon, without flow channel, showing shock formation (bright white oval) near wing/pylon intersection, and an inboard side perspective representation of flow streamlines for a wing/pylon, with inboard flow channel, showing absence of shock formation, respectively.
Figure 12B:
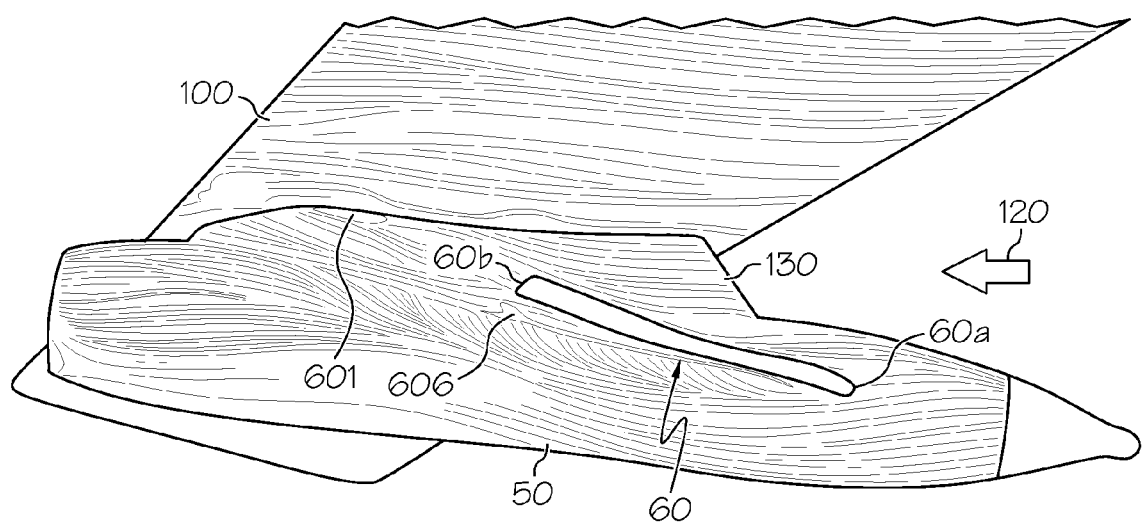

FIGS. 12A and 12B depict wind tunnel photographs of a wing with suspended store without and with inboard flow channel 60 representative of that as disclosed and described herein, respectively. Photographs were taken at the following conditions: Mach 0.86, CL 0.15. Shock 600 of FIG. 12A from freestream 120 is reduced and/or dissipated aft of the intersection of the pylon/wing as shown in FIG. 12B by employing the inboard flow channel.

Figure 13A:
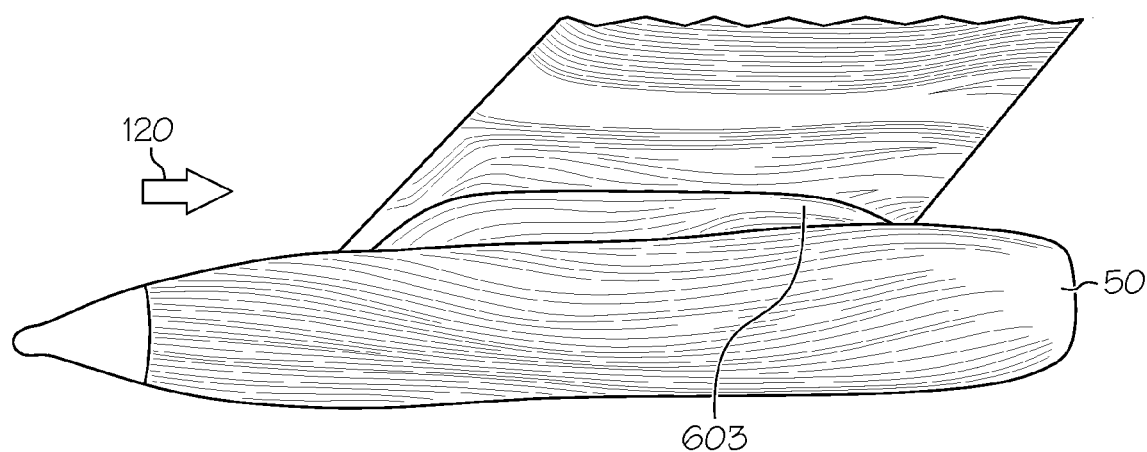
FIGS. 13A and 13B show windtunnel photographs of an outboard side perspective representation of flow streamlines for a wing/pylon, without flow channel, showing flow stagnation and separation just before trailing edge of airfoil, and an outboard side perspective representation of flow streamlines for a wing/pylon, with outboard flow channel, showing absence of stagnant flow.
Figure 13B:
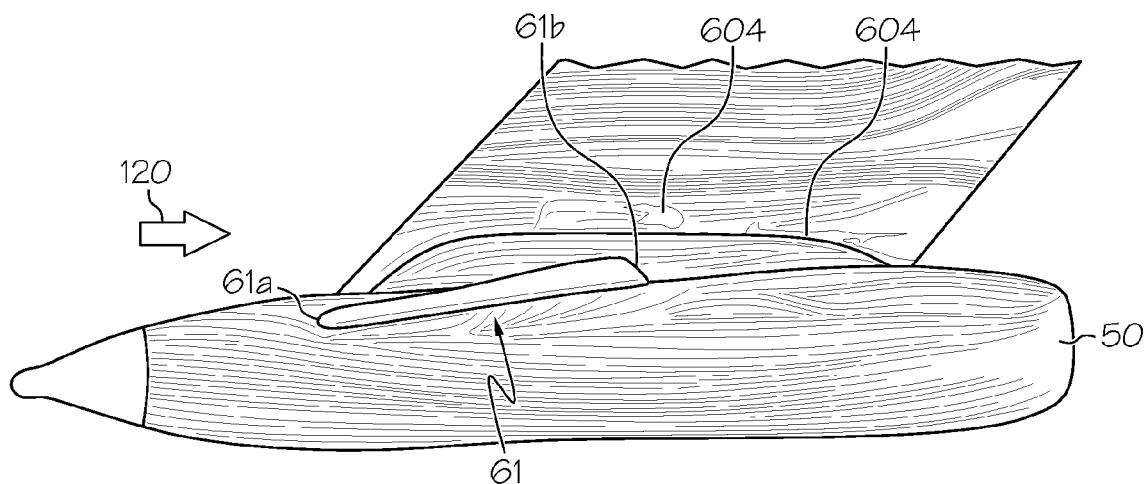

FIGS. 13A and 13B depict wind tunnel photographs of a wing with suspended store without and with outboard flow channel representative of that as disclosed and described herein, respectively. Photographs were taken at the following conditions: Mach 0.86, CL 0.15. Flow stagnation and separation 603 of FIG. 13A from freestream 120 is reduced and/or dissipated aft of the intersection of the pylon/wing to a large area of the wing as shown in FIG. 13B by employing outboard flow channel 61. While not optimized results, these figures demonstrate that by placing flow channels of predetermined configuration, as herein disclosed and described, strategically on the store, the specific flow behaviors of the particular body causing shock formations and/or separation regions can be reduced or eliminated. As a result, undesirable vibrations and buffet of wings of aerospace vehicles, for example, transonic aircraft, can be reduced or eliminated.

Figure 14:
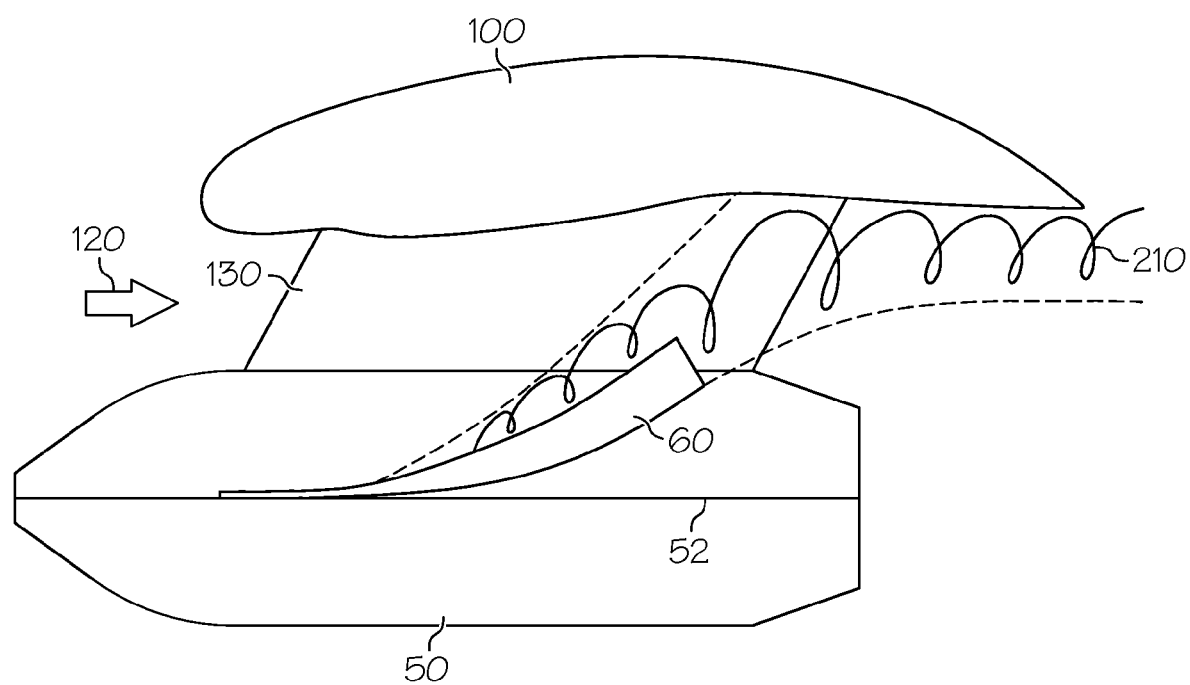
FIG. 14 shows a side perspective representation of a flow channel disclosed and described herein illustrating the vortices' development and relocation of shocks, flow separations off-wing/pylon.

FIG. 14 depicts a schematic representation of flow channel 60 effecting vortices 210 caused by freestream 120 impinging on store 50. Dotted lines indicate region of flow domain where the generated vortices are manipulated aft of the intersection of the pylon/wing to provide the specific flow behaviors of the particular body to mitigate or negate shock formations and separation regions. The vortex 210 merely represents the dominating vortex structure and behavior specifically generated by the flow channel. This figure illustrates the effect of the flow channel in creating vortex 210 and controlling it to a very narrow area that lies in the immediate vicinity aft of the pylon 130. The flow channels are designed and arranged in such a way that they influence flow disruptions or flow separations caused by the leading edge of the store or by the intersection between the pylon and the wing.

Accordingly, a method for reducing or eliminating vibration and/or buffet of an aerospace vehicle having a body on an airfoil is achieved by employing at least one flow channel as described above, modifying resultant vortices formed at air speeds between about 0.2 to about 0.9 mach; and reducing or minimizing shock formations and or separation regions of the freestream.

The flow channels arrangement disclosed herein can be installed during the construction of a new aerospace vehicle or an existing aerospace vehicle can be advantageously retrofitted therewith. The flow channels may be realized, in particular, integrally, or as one piece with the body housing or in the form of a component that can be mounted on the body housing.

The disclosed flow channels can be implemented on one or more sides of a Wing Aerial Refueling Pods (WARPs) of a tanker aircraft vehicle to mitigate detrimental levels of shock formation and separated flow typically encountered on the under surface of the aircraft's wing and on the pod/pylon directly adjacent. As design constraints may not allow for a WARP configuration forward of the wing as would typically be sought for aerodynamic reasons, the flow channel(s) disclosed and described herein provide a solution to a non-optimized WARP installation by reducing or eliminating vibration/buffet using strong vortical flow structures to tailor the flow fields in the vicinity of the WARP/wing junction.

All numbers expressing measurements and/or amounts, and so forth, used in the specification may be to be understood as being modified in all instances by the term "about." Accordingly, unless indicated to the contrary, the numerical parameters set forth herein may be approximations that may vary depending upon the desired properties sought to be obtained.

The above description discloses several flow channel configurations and methods. These descriptions are susceptible to modifications in the materials, configurations, and methods, as well as alterations in the fabrication methods and equipment. Such modifications will become apparent to those skilled in the art from a consideration of this disclosure or practice of the disclosure. Consequently, it is not intended that this disclosure be limited to the specific embodiments disclosed herein, but that it cover all modifications and alternatives coming within the true scope and spirit of the claims.

The invention claimed is:

1. A flow channel attachable to a body positioned on a wing of an aerospace vehicle, the flow channel comprising:
   a channel length having a first portion essentially parallel to a maximum waterline thickness location of the body and at least a second portion non-parallel to the maximum waterline thickness location of the body;
   a leading edge at a first end of the channel length, the leading edge separated from a trailing edge by a continuous free edge along the channel length, the free edge projecting a predetermined height from an attaching edge attachable to at least a portion of a surface of the body; and
   at least a portion of the free edge being arcuate.

2. The flow channel of claim 1, wherein the leading edge is rounded in planform and has a profile essentially perpendicular to the surface of the body to eliminate or reduce premature vortex shedding.

3. The flow channel of claim 1, wherein the trailing edge has an angular termination planform configured to shed vortical air structures.

4. The flow channel of claim 1, wherein the free edge varies from linearity for about the first two thirds of the channel length from the leading edge and wherein the free edge arcuately changes in approximately the last third of the channel length from the leading edge.

5. The flow channel of claim 1, wherein the predetermined height increases from the leading edge to the trailing edge.

6. The flow channel of claim 1, wherein the channel is configured for positioning on one or both of the inboard side surface of the body and the outboard side surface of the body.

7. The flow channel of claim 1, wherein a portion of the free edge has a pitch angle relative to a surface tangent of the body at the attachment edge of the flow channel between about 45 degrees to about 135 degrees.

8. The flow channel of claim 7, wherein the pitch angle is variable along one or more portions of the length of the flow channel.

9. The flow channel of claim 7, wherein the pitch angle is predetermined along one or more portions of the length of the flow channel to maximize vortex shedding of a free stream traveling at a velocity of between about 0.2 to 0.9 mach.

10. The flow channel of claim 1, wherein at least a portion of the free edge is tapered.

11. A method of reducing vibration and/or buffet of an aerospace vehicle having a body on a wing, the method comprising
   providing at least one flow channel attachable to the body, the flow channel comprising
      a channel length having a first portion parallel to a maximum waterline thickness location of the body and at least a second portion non-parallel to the maximum waterline thickness location of the body;
      a leading edge at a first end of the channel length, the leading edge separated from a trailing edge by a continuous free edge along the channel length, the free edge projecting a predetermined height from an attaching edge attachable to at least a portion of a surface of the body; and
      at least a portion of the free edge being arcuate;
   modifying resultant vortices formed at air speeds between about 0.2 to about 0.9 mach; and
   reducing or minimizing shock formations or separation regions of the freestream in proximity to the body and/or body attachment and wing.

12. The method of claim 11, wherein reducing or minimizing shock formations comprises driving regions of complex shock formations and/or pockets of separation aft of the wing and/or the body.

13. The method of claim 11, wherein the channel is positioned on one or both of the inboard side surface of the body and the outboard side surface of the body.

14. The method of claim 11, wherein the plurality of flow channels includes one or more flow channels attached on one or both of the inboard and the outboard sides of the body.

15. The method of claim 11, wherein the leading edge eliminates or limits shedding of the desired vortical air structures.

16. The method of claim 11, wherein the predetermined height of the flow channel further provides a target shedding vortex strength.

17. The method of claim 11, wherein the leading edge is configured for positioning between an angle of about zero to about five degrees downwardly relative to the body longitudinal axis.

18. The method of claim 11, wherein the free edge varies from linearity for about the first two thirds of the channel length from the leading edge and wherein the free edge arcuately changes in approximately the last third of the channel length from the leading edge.

19. The method of claim 11, wherein the predetermined height increases from the leading edge to the trailing edge.

20. The method of claim 11, wherein the body is a Wing Aerial Refueling Pod (WARP).

21. An aerospace vehicle comprising:
   a wing;
   a body coupled to the wing; and
   a flow channel coupled to the body, the flow channel comprising:
      a channel length having a first portion essentially parallel to a maximum waterline thickness location of the store and at least a second portion non-parallel to the maximum waterline thickness location of the body;
      a leading edge at a first end of the channel length, the leading edge separated from a trailing edge by a continuous free edge along the channel length, the free edge projecting a predetermined height from an attaching edge attachable to at least a portion of a surface of the body; and
      at least a portion of the free edge being arcuate.

22. The aerospace vehicle of claim 21, wherein the free edge varies from linearity for about the first two thirds of the channel length from the leading edge and wherein the free edge arcuately changes in approximately the last third of the channel length from the leading edge.

23. The aerospace vehicle of claim 21, wherein the aerospace vehicle is a tanker aircraft.

24. The aerospace vehicle of claim 21, wherein the body is a store.

25. The aerospace vehicle of claim 24, wherein the store is a Wing Aerial Refueling Pod (WARP).

* * * * *